United States Patent
Sakuraba et al.

(10) Patent No.: US 8,818,952 B2
(45) Date of Patent: Aug. 26, 2014

(54) STORAGE APPARATUS AND DUPLICATE DATA DETECTION METHOD

(75) Inventors: Taketoshi Sakuraba, Sagamihara (JP); Taizo Hori, Hadano (JP); Naomitsu Tashiro, Oi (JP)

(73) Assignees: Hitachi, Ltd., Tokyo (JP); Hitachi Information & Telecommunication Engineering, Ltd., Kanagawa (JP)

( * ) Notice: Subject to any disclaimer, the term of this patent is extended or adjusted under 35 U.S.C. 154(b) by 298 days.

(21) Appl. No.: 13/257,536

(22) PCT Filed: Aug. 19, 2011

(86) PCT No.: PCT/JP2011/004635
§ 371 (c)(1),
(2), (4) Date: Sep. 19, 2011

(87) PCT Pub. No.: WO2013/027230
PCT Pub. Date: Feb. 28, 2013

(65) Prior Publication Data
US 2013/0046733 A1 Feb. 21, 2013

(51) Int. Cl.
*G06F 17/30* (2006.01)
*G06F 11/14* (2006.01)

(52) U.S. Cl.
CPC ................... *G06F 11/1453* (2013.01)
USPC .......................................................... 707/640

(58) Field of Classification Search
CPC .............. G06F 3/0641; G06F 11/1453; G06F 17/30159
USPC .................. 707/692, E17.005, 693, 640–653, 707/999.204
See application file for complete search history.

(56) References Cited

U.S. PATENT DOCUMENTS

| | | | |
|---|---|---|---|
| 7,539,710 | B1 | 5/2009 | Haustein et al. |
| 2008/0133446 | A1 | 6/2008 | Dubnicki et al. |
| 2010/0088277 | A1 | 4/2010 | Rao et al. |
| 2010/0142915 | A1* | 6/2010 | McDermott et al. ............ 386/68 |
| 2011/0016091 | A1 | 1/2011 | Prahlad et al. |
| 2011/0107026 | A1* | 5/2011 | Quigley et al. ................ 711/114 |
| 2011/0196854 | A1* | 8/2011 | Sarkar ............................ 707/709 |
| 2012/0185448 | A1* | 7/2012 | Mensch et al. ................ 707/693 |
| 2012/0310890 | A1* | 12/2012 | Dodd et al. .................... 707/646 |
| 2013/0054544 | A1* | 2/2013 | Li et al. ......................... 707/693 |

OTHER PUBLICATIONS

A. Muthitacharoen, et al. "A Low-bandwidth Network File System," Proceedings of the eighteenth ACM Symposium on Operating Systems Principles, 2011, pp. 175-187.

* cited by examiner

*Primary Examiner* — Leslie Wong
(74) *Attorney, Agent, or Firm* — Volpe and Koenig, P.C.

(57) ABSTRACT

An optimum chunk cutout method is selected according to the type of content.
A storage apparatus is a storage apparatus for storing content in a backup volume in response to a content storage request from a host system connected to the storage apparatus via a network and includes a chunk cutout unit for cutting out the content into one or more chunks and a duplication judgment unit for managing a duplicate state of the chunk or chunks which have been cut out by the chunk cutout unit; wherein the chunk cutout unit selects a method for cutting out the chunk based on content type identification information indicating a type of the content.

18 Claims, 14 Drawing Sheets

FIG.4
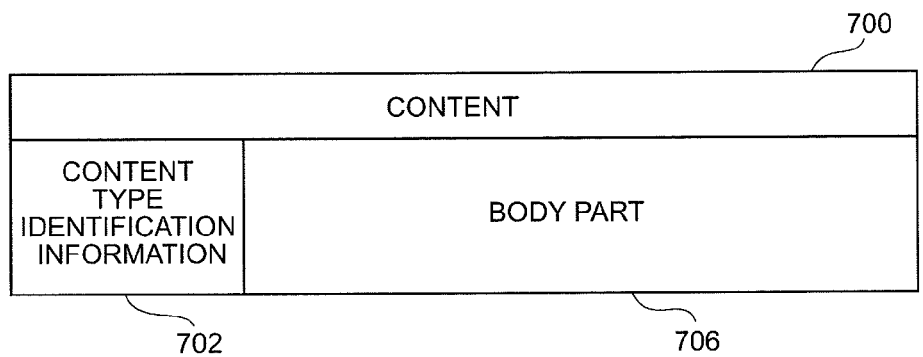
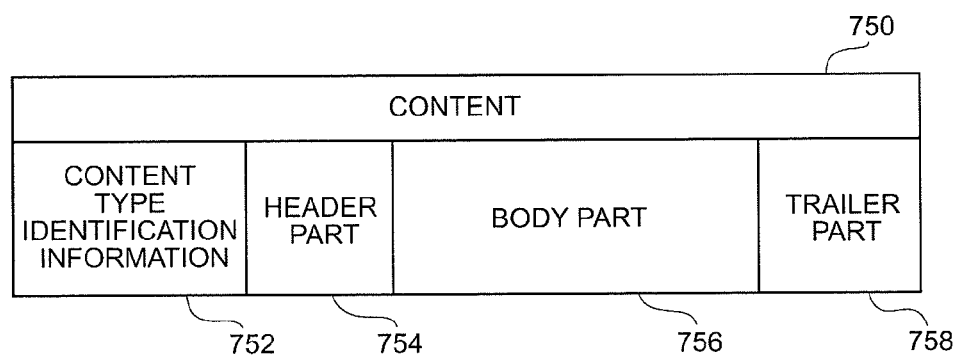
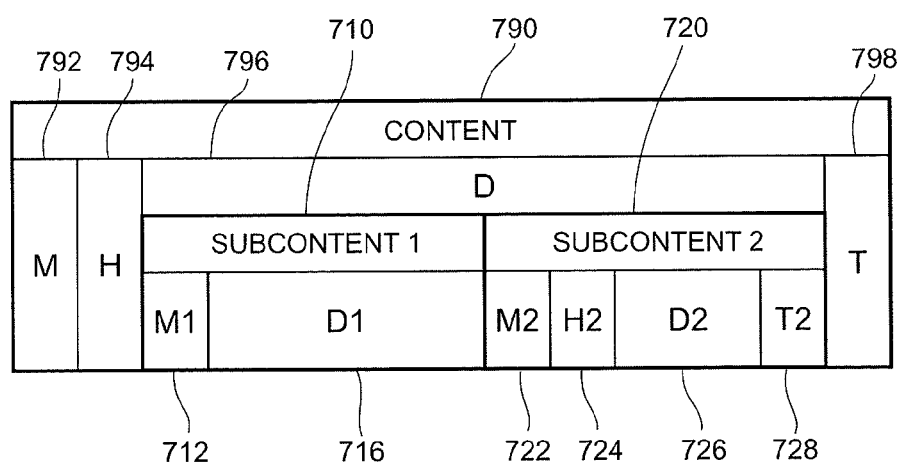

FIG.6

| TYPE INFOR-MATION | TYPE | CHUNK CUTOUT METHOD ||| PROCES-SING FUNCTION |
|---|---|---|---|---|---|
| | | HEADER PART CHUNK LENGTH | BODY PART CHUNK LENGTH | TRAILER PART CHUNK LENGTH | |
| 'A' | A | SINGLE INSTANCE | VARIABLE LENGTH, CHUNK LENGTH | SINGLE INSTANCE | Func_A |
| 'B' | B | FIXED LENGTH Lb | ANALYSIS OF DESCENDENT STRUCTURE | SINGLE INSTANCE | Func_B |
| 'C' | C | FIXED LENGTH Lb | FIXED LENGTH Lc || Func_C |
| OTHER | O | VARIABLE LENGTH MAXIMUM CHUNK LENGTH MINIMUM CHUNK LENGTH ||| Func_O |

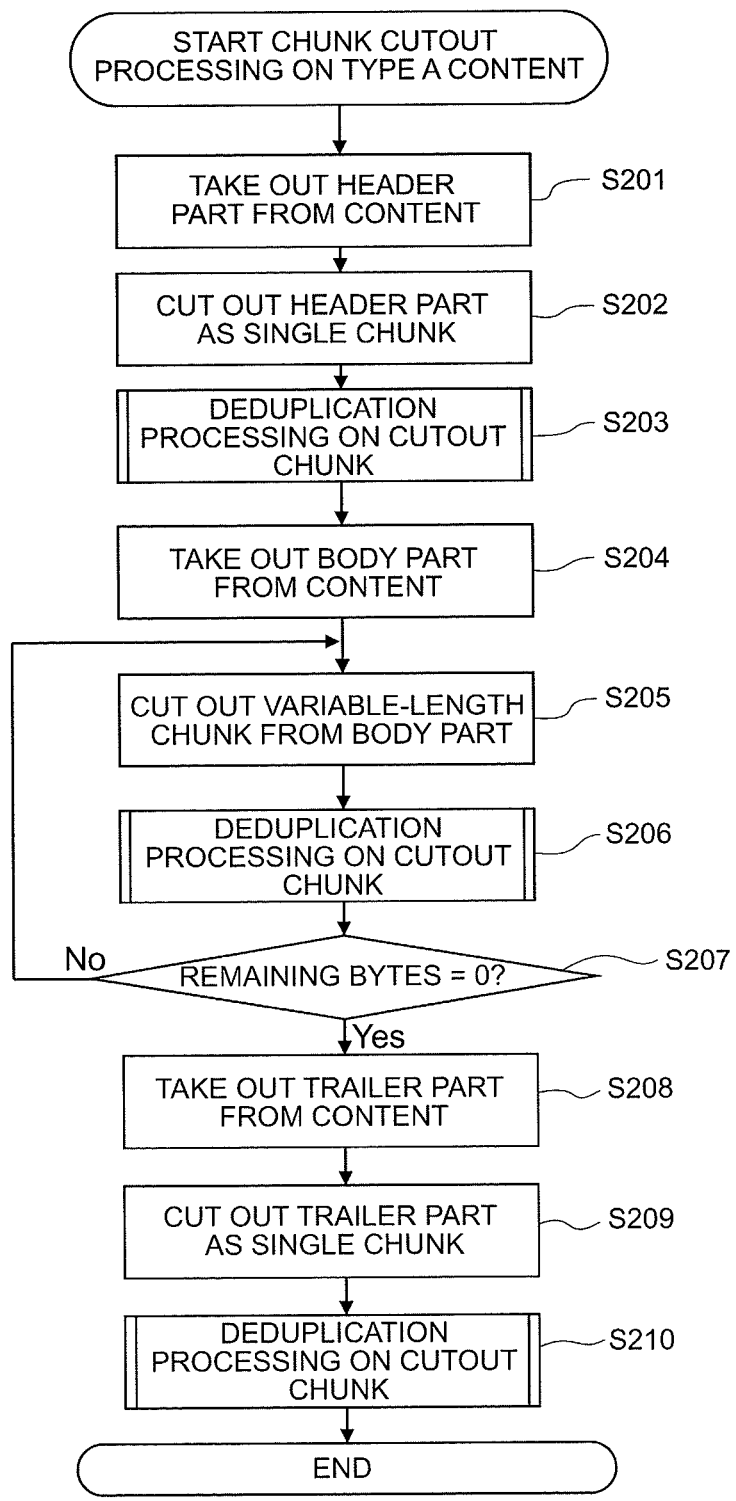

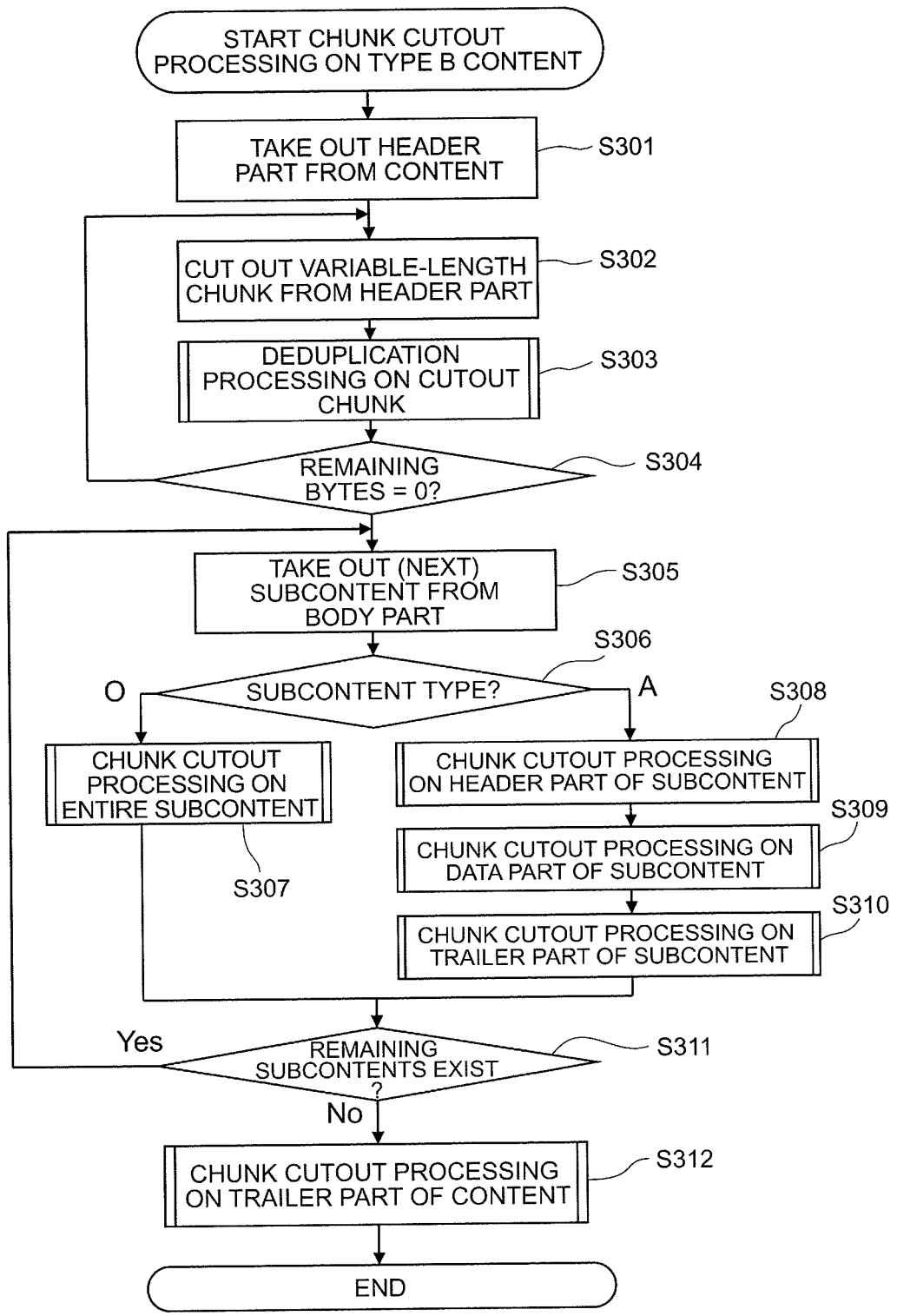

FIG.11

DEDUPLICATION OPTIMIZATION SCREEN

| CONTENT TYPE (1210) | APPLICATION METHOD (1220) | CHUNK LENGTH (1230) |
|---|---|---|
| A | BASED ON STRUCTURE | — |
| HEADER PART | SINGLE INSTANCE | — |
| BODY PART | VARIABLE LENGTH | 32KB |
| TRAILER PART | SINGLE INSTANCE | — |
| B | BASED ON STRUCTURE | — |
| HEADER PART | FIXED LENGTH | 256KB |
| BODY PART | BASED ON STRUCTURE | — |
| TRAILER PART | SINGLE INSTANCE | — |
| C | FIXED LENGTH | 16KB |
| HEADER PART | FIXED LENGTH | 16KB |
| BODY PART | FIXED LENGTH | 8KB |
| O | VARIABLE LENGTH | 8KB |

1200

STORAGE APPARATUS AND DUPLICATE DATA DETECTION METHOD

TECHNICAL FIELD

The present invention relates to a storage apparatus and a duplicate data detection method and is suited for use in a storage apparatus and duplicate data detection method for executing deduplication processing according to the type of data.

BACKGROUND ART

A storage apparatus connected to a host computer via a network is equipped with, for example, a plurality of magnetic disks as storage devices for storing data. When storing data in the storage devices, the amount of data is reduced and then stored in order to reduce costs of storage media. Examples of a method for reducing the amount of data include file compression processing and deduplication processing. The file compression processing reduces a data capacity by condensing data segments with the same content in one file. On the other hand, the deduplication processing reduces a total capacity of data in a file system or a storage system by condensing data segments with the same content detected in not only one file, but also in files. General issues of the deduplication processing are, for example, to reduce a storage capacity as much as possible by enhancing deduplication efficiency, to shorten processing time required for deduplication by increasing processing performance of the deduplication processing, and to reduce management overhead of deduplicated data.

A data segment that is a deduplication processing unit will be hereinafter referred to as a chunk. Also, logically gathered data that is a unit to be stored in a storage device will be hereinafter referred to as content. Examples of the content can include normal files as well as files such as archive files, backup files, or virtual volume files in which normal files are aggregated.

The deduplication processing is composed of processing for sequentially cutting out chunks from the content, processing for judging whether or not any duplicate chunks exists in the cutout chunks, and processing for storing the chunks. It is important to cut out a larger number of data segments with the same chunk content during the chunk cutout processing in order to execute the deduplication processing efficiently.

Examples of the chunk cutout method include a fixed-length chunk cutout method and a variable-length chunk cutout method. The fixed-length chunk cutout method is a method of sequentially cutting out chunks with a certain length such as 4 kilobytes (KB) or 1 megabyte (MB). The variable-length chunk method is a method of cutting out the content by determining chunk cutout boundaries based on local conditions of content data.

Furthermore, Patent Literature 1 discloses a basic object (primitive object) cutout method as a content division method. Basic objects are various data such as images, texts, and diagrams and these basic objects are embedded in a data object called a rich media file. One rich media file contains a plurality of basic objects and these basic objects are normally compressed and then embedded in a rich media file. According to Patent Literature 1, the structure of a rich media file is detected, logically meaningful data segments are taken out, the compressed data are decompressed as necessary, and the basic objects are thereby cut out.

CITATION LIST

Patent Literature

[PTL 1]
US 2010/0088277 A1

Non Patent Literature

[NPL 1]
a. Muthitacharoen, et al. "A Low-bandwidth Network File System", Proceedings of the eighteenth ACM Symposium on Operating Systems Principles, 2001, pp. 175-187

SUMMARY OF INVENTION

Technical Problem

Regarding the fixed-length chunk cutout method, the overhead for cutting out chunks is small; however, if a change of the content data is a change by, for example, data insertion, chunks are shifted after insertion of the data and the shifted chunks are then cutout, thereby reducing the deduplication efficiency. On the other hand, regarding the variable-length chunk cutout method, the deduplication efficiency can be increased because the boundary positions where the chunks are cut out do not change even if the chunks are shifted by data insertion; however, overhead of processing for searching the chunk boundaries increases. Furthermore, the basic data cutout method requires repeated execution of the decompression processing in order to cut out the basic data, so that there is a problem of an increase in the overhead of the deduplication processing.

Therefore, the problem is that in consideration of trade-off between the deduplication efficiency and the overhead of the deduplication processing, the entire deduplication processing cannot be optimized even if the deduplication processing is executed by using any one of the above-mentioned chunk cutout methods.

The present invention was devised in consideration of the above-described circumstances and aims at suggesting a storage apparatus and duplicate data detection method capable of selecting an optimum chunk cutout method according to the type of content.

Solution to Problem

In order to solve the above-described problem, a storage apparatus for storing content in a backup volume in response to a content storage request from a host system connected to the storage apparatus via a network is provided according to the present invention, wherein the storage apparatus includes: a chunk cutout unit for cutting out the content into one or more chunks; and a duplication judgment unit for managing a duplicate state of the chunk or chunks which have been cut out by the chunk cutout unit; wherein the chunk cutout unit selects a method for cutting out the chunk based on content type identification information indicating a type of the content.

According to the above-described configuration, a backup apparatus cuts out the content provided by the host system into one or more chunks and manages a duplicate state of the cutout chunks. When cutting out the chunks, the backup apparatus selects a method for cutting out the content based on the content type identification information indicating the content type. Accordingly, deduplication efficiency and processing efficiency of the deduplication processing can be enhanced by selecting the chunk cutout method according to the content type and cutting out the chunks by the selected method.

Advantageous Effects of Invention

According to the present invention, the deduplication efficiency and processing efficiency of the deduplication processing can be enhanced by selecting an optimum chunk cutout method according to the type of content.

BRIEF DESCRIPTION OF DRAWINGS

FIG. 4 is a conceptual diagram explaining the structure of content according to the first embodiment.

FIG. 6 is a chart showing a chunk cutout method control table according to the first embodiment.

FIG. 7 is a flowchart illustrating a processing sequence for the chunk cutout processing according to the first embodiment.

FIG. 8 is a flowchart illustrating a processing sequence for the chunk cutout processing according to the first embodiment.

FIG. 11 is a chart showing a deduplication optimization screen according to the first embodiment.

DESCRIPTION OF EMBODIMENTS

Figure 1:
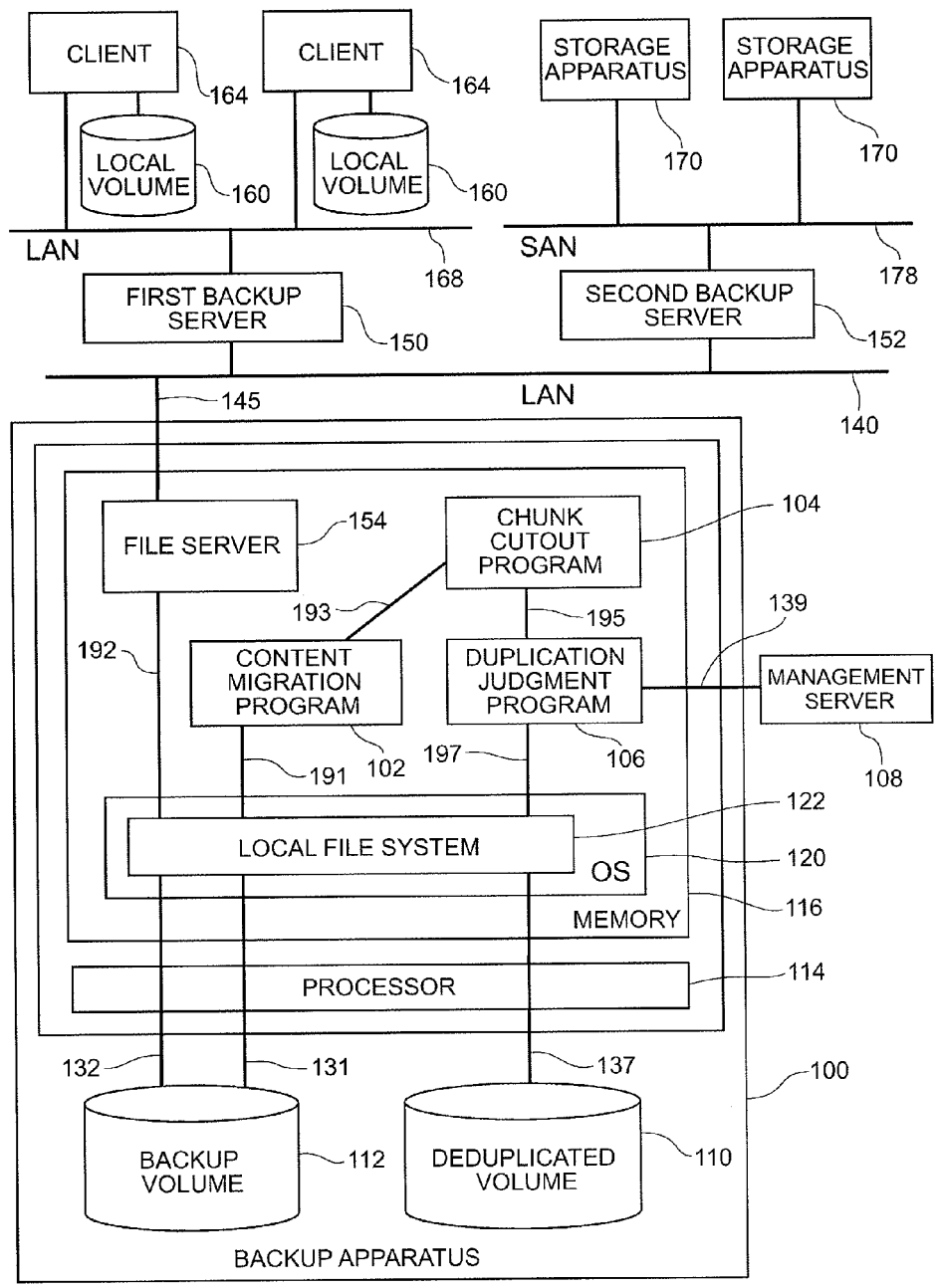
FIG. 1 is a block diagram showing a hardware configuration of a computer system according to a first embodiment of the present invention.

An embodiment of the present invention will be described below in detail with reference to the attached drawings.

(1) First Embodiment (1-1) Outline of this Embodiment

Firstly, the outline of this embodiment will be explained. Examples of a method for reducing the amount of data include file compression processing and deduplication processing. The file compression processing reduces a data capacity by condensing data segments with the same content in one file. On the other hand, the deduplication processing reduces a total capacity of data in a file system or a storage system by condensing data segments with the same content detected in not only one file, but also in files. General issues of the deduplication processing are, for example, to reduce a storage capacity as much as possible by enhancing deduplication efficiency, to shorten processing time required for deduplication by increasing processing performance of the deduplication processing, and to reduce management overhead of deduplicated data.

A data segment that is a deduplication processing unit will be hereinafter referred to as a chunk. Also, logically gathered data that is a unit to be stored in a storage device will be hereinafter referred to as content. Examples of the content can include normal files as well as files such as archive files, backup files, or virtual volume files in which normal files are aggregated.

The deduplication processing is composed of processing for sequentially cutting out chunks from the content, processing for judging whether or not any duplicate chunks exists in the cutout chunks, and processing for storing the chunks. It is important to cut out a larger number of data segments with the same chunk content during the chunk cutout processing in order to execute the deduplication processing efficiently.

Examples of the chunk cutout method include a fixed-length chunk cutout method and a variable-length chunk cutout method. The fixed-length chunk cutout method is a method of sequentially cutting out chunks with a certain length such as 4 kilobytes (KB) or 1 megabyte (MB). The variable-length chunk method is a method of cutting out the content by determining chunk cutout boundaries based on local conditions of content data.

Furthermore, there is a basic object (primitive object) cutout method as a content division method. Basic objects are various data such as images, texts, and diagrams and these basic objects are embedded in a data object called a rich media file. One rich media file contains a plurality of basic objects and these basic objects are normally compressed and then embedded in a rich media file. By the basic object cutout method, the structure of a rich media file is detected, logically meaningful data segments are taken out, the compressed data are decompressed as necessary, and the basic objects are thereby cut out.

Regarding the fixed-length chunk cutout method, the overhead for cutting out chunks is small; however, if a change of the content data is a change by, for example, data insertion, chunks are shifted after insertion of the data and the shifted chunks are then cutout, thereby reducing the deduplication efficiency. On the other hand, regarding the variable-length chunk cutout method, the deduplication efficiency can be increased because the boundary positions where the chunks are cut out do not change even if the chunks are shifted by data insertion; however, overhead of processing for searching the chunk boundaries increases.

Furthermore, regarding the basic data cutout method, data duplication which has been hidden by compression can be detected by decompressing the data; however, it is necessary to repeat the data decompression processing in order to cut out the basic data, which results in an increase in the overhead of the deduplication processing. On the other hand, if the rich media file is simply copied and not compressed, the deduplication efficiency will not be greatly influenced even if the chunk cutout processing is executed without decomposing the basic data and in a state where the plurality of basic data are embedded; and the problem is that the overhead for taking out the basic data cannot be saved.

Therefore, the problem is that in consideration of trade-off between the deduplication efficiency and the overhead of the deduplication processing, the entire deduplication processing cannot be optimized even if the deduplication processing is executed by using any one of the above-mentioned chunk cutout methods.

So, according to this embodiment, an optimum chunk cutout method is selected according to each content type by switching the chunk cutout method to be applied during the chunk cutout processing based on properties of each piece of content or each part of the content. The content type can be judged by detecting type identification information which is attached to each piece of content. The optimum chunk cutout method can be selected according to the content type by being aware of the properties and structure of the content corresponding to the content type in advance.

For example, if certain content is of a type that does not change so much, it is desirable that the fixed-length chunk method should be applied to the content to cut out the chunks. Furthermore, in a case of large-sized content, cutting out chunks of a larger size results in smaller processing overhead; and in a case of small-sized content, the size of a chunk to be cut out should preferably be small. Also, if any data is inserted into the content, it is desirable that the variable-length chunk method should be applied to cut out the chunks. If any data is inserted into the content but the content does not change so much, the processing efficiency can be enhanced without degradation of the duplication efficiency and the management overhead can be reduced by cutting out large-sized chunks.

Moreover, the content having a specified structure can be divided into respective parts such as a header part, a body part, and a trailer part and a different chunk cutout method is to be applied to each part. The deduplication efficiency and the processing efficiency can be optimized by applying a desired chunk cutout method to each part.

Furthermore, the content such as a backup file, an archive file, or a virtual volume file is configured so that a plurality of files are further contained in the file (body part). These files are called subcontent. If the content contains the subcontent, enhancement of the deduplication efficiency can be expected by executing the deduplication processing on the subcontent. So, the chunk cutout method which is suited for the subcontent type is also applied to the subcontent. Furthermore, if the subcontent has a specified structure, the chunk cutout method is selected according to each property of the header part, the body part, and the trailer part of the subcontent, thereby optimizing the deduplication processing.

Therefore, according to this embodiment, the deduplication efficiency and processing efficiency of the deduplication processing can be enhanced by selecting an optimum chunk cutout method according to the content type.

(1-2) Hardware Configuration of Computer System

Next, the hardware configuration of a computer system 1 will be explained. Referring to FIG. 1, the computer system 1 includes a backup apparatus 100, clients 164, a storage apparatus 170, a first backup server 150, and a second backup server 152. The backup apparatus 100 according to this embodiment uses a postprocess-type deduplication system. The postprocess-type deduplication system is a system that takes out data, which was stored once in storage media in the backup apparatus 100 and then deduplicates it, thereby reducing the data capacity in the backup apparatus 100.

The backup apparatus 100 is a computer device equipped with information processing resources such as a CPU and a memory, is connected to a LAN (Local Area Network) 140 via a LAN interface 145, and is connected to the first backup server 150 and the second backup server 152.

The first backup server 150 is a computer device equipped with information processing resources such as a CPU and a memory and is connected to the LAN 140 and to a plurality of clients 164 via a LAN 168. The client 164 has local volumes 160 for storing data. The backup server 150 gathers data stored in the local volume 160 and stores the data as backup files in a backup volume 112 of the backup apparatus 100. Regarding the backup files to be stored in the backup volume 112, a file server 154 stores the backup files in the backup volume 112 via an access path 132 by using a local file system 122 of an OS (Operating System) 120.

Furthermore, the second backup server 152 is a computer device equipped with information processing resources such as a CPU and a memory, is connected to the LAN 140, and is also connected to storage apparatuses 170 via a SAN 178. The second backup server 152 accesses the storage apparatuses 170, gathers data stored in storage areas of the storage apparatuses 170, and stores the data as backup files in the backup volume 112 of the backup apparatus 100. The file server 154 also stores such backup files in the backup volume 112 via the access path by using the local file system 122 of the OS 120.

The management server 108 is connected to the backup apparatus 100 via a management communication path 139. The management server 108 is a computer device equipped with information processing resources such as a CPU and a memory and is a device for managing, for example, deduplication processing of the backup apparatus 100 in accordance with input by, for example, an operator. The management communication path 139 may be the LAN 140 or a serial interface provided for exclusive use.

(1-3) Functional Structure of Backup Apparatus

The backup apparatus 100 includes, for example, a deduplicated volume 110, the backup volume 112, a processor 114, and a memory 116 as shown in FIG. 1. The memory 116 stores the processor 114, the OS 120, the file server 154, and various programs. The various kinds of software operate under control of the OS 120 stored in the memory 116. The software stored in the memory 116 includes, for example, a content migration program 102, a chunk cutout program 104, and a duplication judgment program 106.

The content migration program 102 reads a backup file stored in the backup volume 112 and provides it as the content to the chunk cutout program 104. Furthermore, the chunk cutout program 104 cuts out a chunk(s), which is a deduplication processing unit, from the content provided from the content migration program 102. The chunk cutout program 104 cuts out the chunk(s) from the content by using an optimum chunk cutout method according to the content type. The chunk cutout processing by the chunk cutout program 104 will be explained later in detail.

The duplication judgment program 106 judges a duplicate state of the chunks, which have been cut out by the chunk cutout program 104, and writes the chunks to the deduplicated volume 110 via the access path 137 as necessary. Furthermore, the duplication judgment program 106 executes the deduplication processing and monitors a deduplication status in accordance with instruction from, for example, the operator, which is input via the management server 108.

The deduplicated volume 110 and the backup volume 112 are composed of, for example, hard disk drives (HDD).

(1-4) Chunk Cutout Processing

Next, the chunk cutout processing according to this embodiment will be explained. The chunk cutout program 104 selects an optimum chunk cutout method according to the content type with respect to the content provided from the content migration program 102 as described above. The chunk cutout program 104 then executes the content cutout processing, using the selected chunk cutout method.

Figure 2:
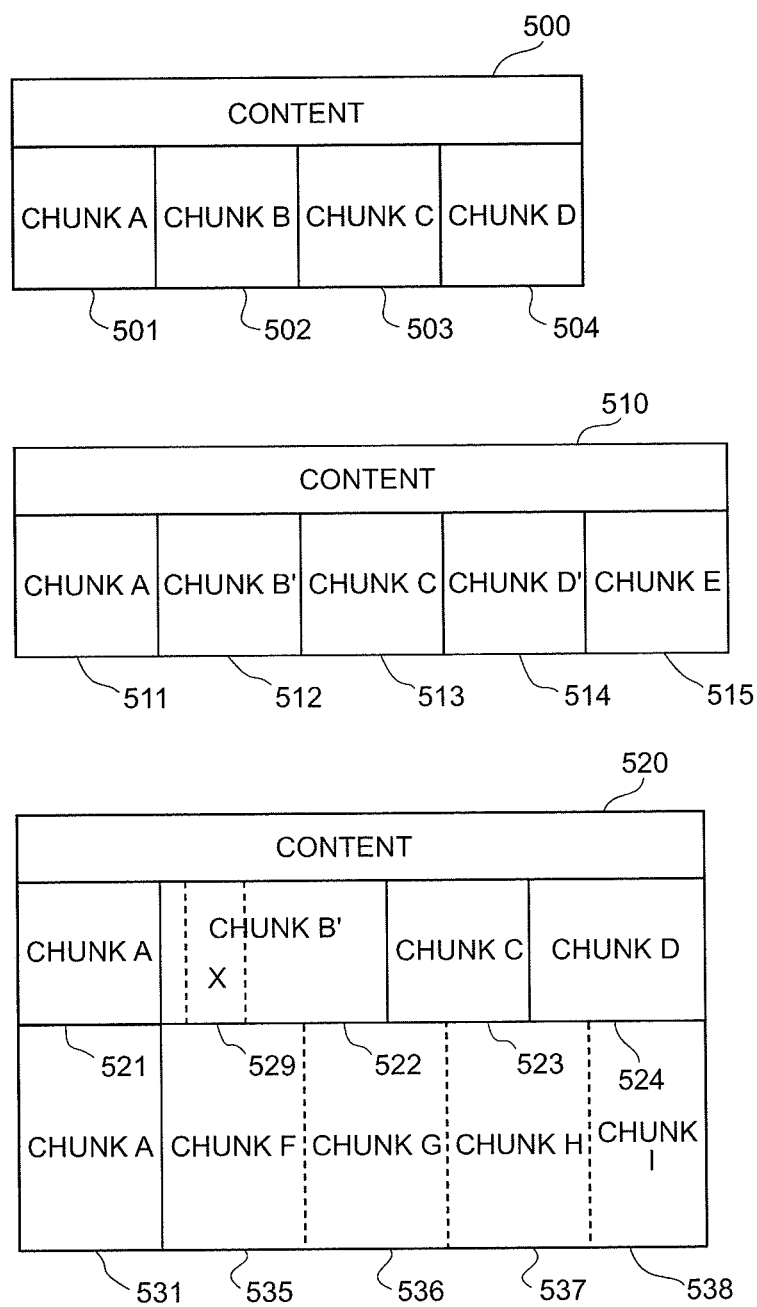
FIG. 2 is a conceptual diagram explaining chunk cutout methods according to the first embodiment.

The chunk cutout method will be explained with reference to FIG. 2. Firstly, the fixed-length chunk method will be explained. Regarding content 500, chunk A (501) to chunk D (504) with a fixed length have been cut out and stored in the backup volume 112 as shown in FIG. 2. Furthermore, content 510 is obtained by rewriting chunk B (502) of the content 500, additionally writing data to the content 500, and then storing it in the backup volume 112.

As a result of rewriting of the content 500, the second chunk of the content 510 after rewriting data is changed to chunk B' (512) and the additionally written data is cut out as chunk E (515). Furthermore, regarding chunk D (504) of the content 500, if the length of the chunk D (504) is shorter than a specified fixed length, the additionally written data is added after the chunk D (504) and the data with the specified fixed length is cut out. Therefore, regarding chunk D' (514) of the content 510, the data additionally written to the chunk D (504) is added and the chunk D' (514) which is different from the chunk D (504) is stored.

Meanwhile, no change is made to the chunk A and the chunk C and their positions in the content do not change, so the chunk A (511) and the chunk C (513) are cut out from the content 510 by the fixed-length chunk method. Therefore, since the chunk A (511) and the chunk C (513) of the content 510 and the chunk A (501) and the chunk C (503) of the content 500 are redundant, the chunk A (511) and the chunk C (513) are deduplicated by the duplication judgment program 106. In other words, the chunk A (511) and the chunk C (513) are not stored in the deduplicated volume 110 and only reference information indicating reference to the chunk A (511) and the chunk C (513) is recorded.

Furthermore, content 520 is obtained by inserting data X (529) into the content 500. Along with the insertion of the data X (529), the positions (offset) of the chunk C (523) and the chunk D (524) in the content change. In a case of the fixed-length chunk method, the content 520 is cut out into chunk A (531), chunk F (535), chunk G (536), chunk H (537), and chunk I (538). Specifically speaking, although the content of the already stored chunk C (523) and chunk D (524) is included, it is necessary to store the chunk F (535) to the chunk I (538) as new chunks in the deduplicated volume 110.

Next, the variable-length chunk method will be explained. By the variable-length chunk method, a chunk can be cut out even if the position (offset) of the chunk is shifted like the chunk C (523) of the content 520. Specifically speaking, regarding the variable-length chunk method, if local data of the chunk satisfies a certain condition, a position satisfying the condition is recognized as a boundary of the chunk. For example, a hash value of consecutive 48-byte data in the content is sequentially calculated while shifting the position by 1 byte. Then, if the calculated result satisfies a certain condition, the position satisfying the condition is set as a boundary. Also, if no change is made to the 48-byte data, whose top and end become boundaries, or around the 48-byte data even after insertion of the data, the hash value of that part does not change and that position can be set as a boundary of the chunk.

Figure 5:
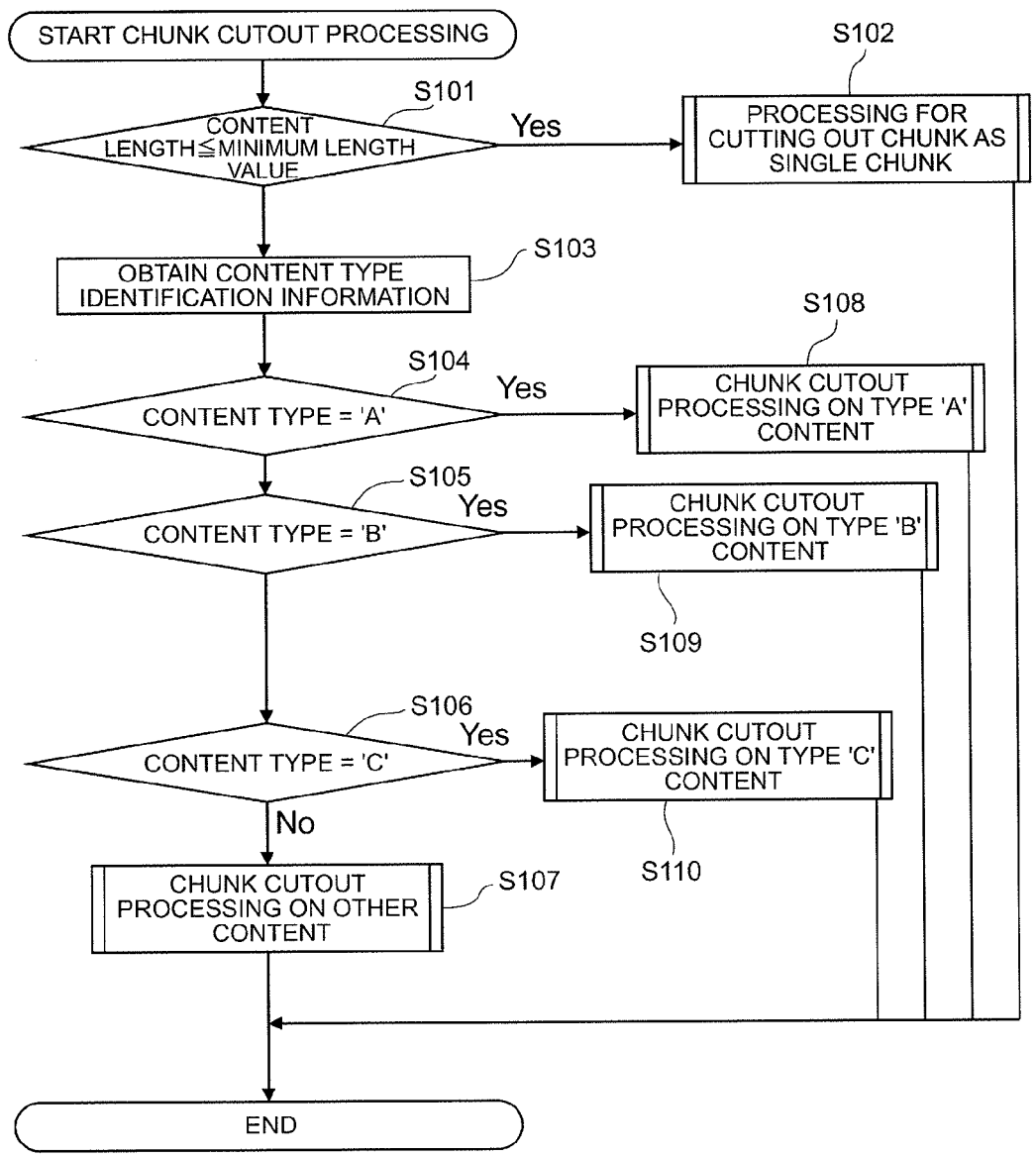
FIG. 5 is a flowchart illustrating a processing sequence for chunk cutout processing according to the first embodiment.

For example, referring to FIG. 5, the content 500 is divided into the chunk A (501) to the chunk D (504) by the variable-length chunk method. Specifically speaking, a boundary between the chunk A (501) and the chunk B (502) is determined by a hash value of 48-byte data around this boundary and a boundary between the chunk B (502) and the chunk C (503) and a boundary between the chunk C (503) and the chunk D (504) are similarly determined by a hash value of data around the relevant boundary.

Regarding the content 510, the chunk B (502) is rewritten and changed to the chunk B'(512), but it can be expected with a high probability that data around the boundaries between the respective chunks has not changed. Accordingly, the chunk C and the chunk D can be cut out regarding the content 510, so that the chunk C and the chunk D can be deduplicated. Similarly, regarding the content 520, it appears that data around the boundaries between the respective chunks has not changed regardless of the insertion of the data X (529). Therefore, the chunk C (523) and the chunk D (524) can be cut out and the chunk C and the chunk D of the content 510 can be deduplicated.

As a result, the deduplication efficiency of the content to which data may possibly be inserted can be increased by the variable-length chunk method; however, the overhead for hash value calculation processing for determining the chunk boundaries increases.

Furthermore, a sing instance method for executing the deduplication processing by recognizing the entire one content as one chunk is also possible without performing the chunk cutout by the above-described fixed-length chunk method and variable-length chunk method.

Figure 3:
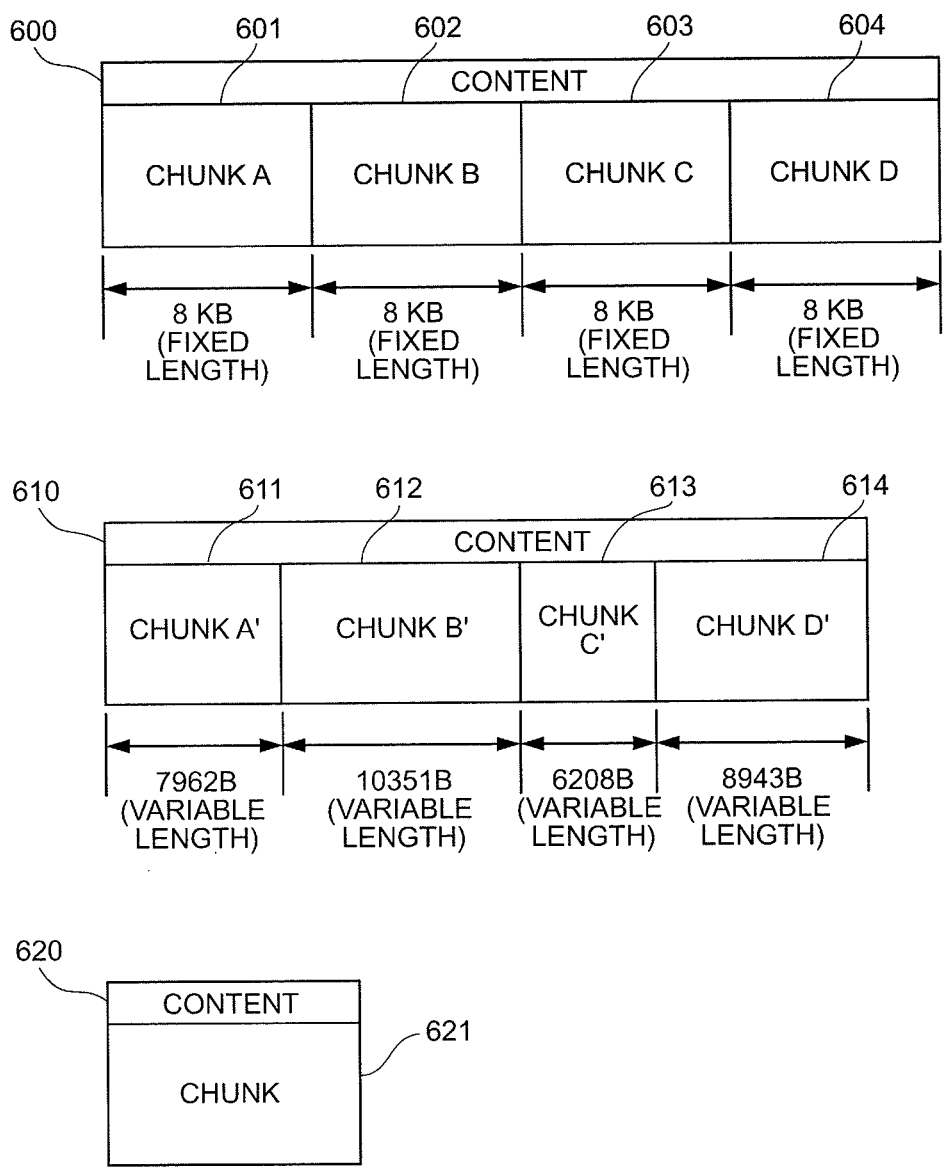
FIG. 3 is a conceptual diagram explaining the chunk cutout methods according to the first embodiment.

FIG. 3 shows the results of cutting out chunks by applying the above-described chunk cutout methods to the content. For example, content 600 shows the result of cutting out chunks with an 8-KB fixed length. Chunk A (601) to chunk D (604) are cut out so that the size of each chunk from its top sequentially becomes 8 kilobytes. Therefore, 8 kilobytes are added to the offset so that the offset of the chunk A (601) is 0, the offset of the chunk B (602) is 8 kilobytes, and the offset of the chunk C (603) is 16 kilobytes.

On the other hand, regarding content 610, chunk A' (611) to chunk D' (614) are cut out, but the length of each chunk is different. As a result, the offset of each chunk is not necessarily a multiple of 8 kilobytes. Since the length of the variable-length chunk is determined by setting chunk boundaries based on local properties of the content data, for example, a hash value of the relevant local 48-byte data, the length itself is meaningless. However, when cutting out the chunks, a minimum value and maximum value of the chunk length may be given in order to prevent excessively short or long chunk from being cut out.

Furthermore, content 620 shows the cutout result by the single instance method of treating the entire content as one chunk 621 without cutting out the content into a plurality of chunks.

Next, a typical example of the content structure will be explained with reference to FIG. 4. Content 700 is the content that does not particularly have any structure. The structure herein used means rules about data arrangement according to which specified data exists at a specified position in the relevant content. Furthermore, each program such as the chunk cutout program 104 recognizes that the content contains the structure. In other words, if the content is configured to have some kind of structure, but that structure is not recognized by the programs, this means the structure of the content practically does not exist.

The content 700 contains content type identification information 702 and the remaining part is a body part 706 which does not practically have any structure. Also, the content 700 may sometimes not even have the content type identification information and the entire content may be data which does not have any structure. Regarding such content, the content type identification information 702 and the body part 706 are handled collectively.

Content 750 is constituted from content type identification information 752, a header part 754, a body part 756, and a trailer part 758. The content type identification information contains the data type of the entire content and information about an application(s) which created this content. The content type identification information is normally located at the top part of the content. The position and length of data in that content and how to read the data can be recognized according to the data type. Therefore, a method for analyzing the header part and the body part can be changed according to the data type. Incidentally, this embodiment describes that the content type identification information 752 is located at the top part of the content; however, the invention is not limited to this example and the content type identification information 752 may be located at a position other than the top part of the content.

The header part 754 describes the structure of the content and is normally located near the top of the content. The positions of the body part 756 and the trailer part 758 in the content are recognized by analyzing the header part 754. It is also possible to obtain information about detailed components of the body part 756 and their positions. Incidentally, the content type identification information 752 and the header part 754 may be handled collectively.

The trailer part 758 is normally located at the end of the content. Information about the entire content 750 such as content length information is stored in the trailer part 758. Also, the information of the trailer part 758 can be used for a validity check of the content processing. Padding data which is logically meaningless may sometimes be stored in the trailer part 758.

Similarly, content 790 is constituted from content type identification information M (792), a header part H (794), a body part D (796), and a trailer part T (798). The body part D (796) contains one or more pieces of subcontent and the content 790 contains, for example, two pieces of subcontent, that is, subcontent 1 (710) and subcontent 2 (720).

The subcontent itself may have a structure like that of the content 700 or the content 750. For example, the subcontent 1 (710) is constituted from only content type identification information M1 (712) and a body part D1 (716) similar to those of the content 700. Furthermore, the subcontent 2 (720) has a structure similar to that of the content 750 and the subcontent 2 is constituted from content type identification information M2 (722), a header part H2 (724), a body part D2 (726), and a trailer part T2 (728). Such structure can exist in a case where the content 790 is an archive file in which the subcontent 1 (710) and the subcontent 2 (720) are gathered. Other examples of content having such structure include a backup file, a virtual disk volume, and a rich media file.

Next, the outline of the chunk cutout processing executed by the chunk cutout program 104 of the backup apparatus 100 will be explained. Referring to FIG. 5, when receiving the content 700, the content 750, or the content 790 shown in FIG. 4 from the content migration program 102, the chunk cutout program 104 evaluates the length of the content (S101). The length of the content is included in, for example, meta data created when storing the content in the backup volume 112; and is included in information to be delivered together with the content when the content migration program 102 delivers the content to the chunk cutout program 104. Specifically speaking, the chunk cutout program 104 judges whether the content length is equal to or shorter than a specified minimum value which was set in advance.

If it is determined in step S101 that the content length is equal to or shorter than the specified minimum value, the chunk cutout program 104 executes the chunk cutout processing by recognizing the content as a single chunk (S102). Even if the content with the length equal to or shorter than the specified minimum value becomes a deduplication target, the deduplication efficiency and data storage efficiency cannot be enhanced greatly. Therefore, even if the content contains a plurality of chunks, they are treated as one chunk as a whole.

If it is determined in step S101 that the content length is longer than the specified minimum value, the chunk cutout program 104 obtains the content type identification information (S103). The content type identification information can be assumed to be located at the same position such as the top of the content even when the content has a structure like that of any of the content 700, 750 and 792 as shown in FIG. 4. Therefore, the content type identification information can be obtained without distinguishing which structure the relevant content has. Incidentally, data of the content type identification information may be used without any change, or data of part of the content type identification information may be used, or the content type identification information may be processed to data which can be handled easily. In the following explanation, data which is taken out as the content type identification information is associated with the respective content types to prepare appropriate chunk cutout processing for each content type.

Then, the chunk cutout processing specific to each content is selected based on the content type identification information obtained in step S103. Specifically speaking, the chunk cutout program 104 firstly judges whether the content type identification information is A or not (S104). If it is determined in step S104 that the content type identification information is A, the chunk cutout program 104 executes the chunk cutout processing which is prepared for the content whose content type is A (S108).

If it is determined in step S104 that the content type identification information is not A, the chunk cutout program 104 judges whether the content type identification information is B or not (S105). If it is determined in step S105 that the content type identification information is B, the chunk cutout program 104 executes the chunk cutout processing which is prepared for the content whose content type is B (S109).

If it is determined in step S105 that the content type identification information is not B, the chunk cutout program 104 judges whether the content type identification information is C or not (S106). If it is determined in step S106 that the content type identification information is C, the chunk cutout program 104 executes the chunk cutout processing which is prepared for the content whose content type is C (S110).

If it is determined in step S106 that the content type identification information is not C, the chunk cutout program 104 executes the chunk cutout processing for other content (S107) and then terminates the chunk cutout processing. In the above explanation, the chunk cutout processing corresponding to each content type is prepared for the case where the content type is any of A to C; however, the invention is not limited to such an example and the chunk cutout processing corresponding to a plurality of content types may be prepared. In this case, the content type identification information is judged sequentially and the chunk cutout processing corresponding to each content type is executed in the same manner as in step S103 to S105.

The chunk cutout program 104 provides the chunks, which were cut out by the above-described processing, one by one or collectively as a set of chunks to the duplication judgment program 106. Then, the duplication judgment program 106 examines the duplicate state of each chunk and executes processing for eliminating duplicate chunks and processing for storing new chunks.

The chunk cutout program 104 executes the cutout processing by using a chunk cutout method control table 900 shown in FIG. 6. The details of the cutout processing will be explained with reference to the chunk cutout method control table in FIG. 6. The chunk cutout method control table 900 is a table for managing the chunk cutout method corresponding to the content type and is constituted from a type information column 901, a type column 902, a chunk cutout method column 903, and a processing function column 904. The type information column 901 stores the content type identification information included in the content. The type column 902 stores the content type corresponding to the content type identification information. The chunk cutout method column 903 stores the chunk cutout method corresponding to the content type. Furthermore, if the content is constituted from the header part, the body part, and the trailer part, the chunk cutout method column 903 includes a header part chunk length column 907, a body part chunk length column 908, and a trailer part chunk length column 909. The processing function column 904 stores information about a processing function for the cutout processing.

In steps S104, S105, S106 shown in FIG. 5, the chunk cutout program 104 compares the content type identification information of the content as obtained in step S103 with the content type identification information stored in the type information column 901 of each entry of the chunk cutout method control table 900; and if the content type identification information of the content as obtained in step S103 matches any of the content type identification information stored in the type information column 901, the chunk cutout program 104 determines that the relevant content is of the content type stored in the corresponding type column 902. Then, the chunk cutout program 104 invokes the processing function stored in the processing function column 904 corresponding to the entry of the relevant content type and executes processing according to the relevant processing function.

For example, If the content type identification information included in the content is A, the corresponding content type is A and the processing function is Func_A. Therefore, the processing function Func_A is invoked in step S108 in FIG. 5 and the chunk cutout processing is executed.

Furthermore, if the content type identification information included in the content is B, the corresponding content type is B and the processing function is Func_B. Therefore, the processing function Func_B is invoked in step S109 in FIG. 5 and the chunk cutout processing is executed.

Furthermore, the content type identification information included in the content is C, the corresponding content type is C and the processing function is Func_C. Therefore, the processing function Func_C is invoked in step S110 in FIG. 5 and the chunk cutout processing is executed.

Furthermore, the content type identification information included in the content is other than A to C, the corresponding content type is O and the processing function is Func_O. Therefore, the processing function Func_O is invoked in step S107 in FIG. 5 and the chunk cutout processing is executed.

In step S107, the chunk cutout processing is executed on the content having no structure like the content 700 shown in FIG. 4. Specifically speaking, the content type of the content having no structure is O, its corresponding chunk cutout method is the variable-length chunk cutout method, and a minimum chunk length and maximum chunk length of the chunk to be cut out are set in advance. The processing function Func_O corresponding to the content type O executes processing by reflecting parameters stored in the chunk cutout method column 903. For example, if the minimum chunk length is set to 4 KB and the maximum chunk length is set to 12 KB, new division lines are set between a position 4 KB added to an offset position, from which a chunk was cut out last time, and a position 12 KB added to the offset position.

Furthermore, in step S110, the chunk cutout processing is executed on the content whose content type is C; and settings are made in the chunk cutout method column 903 corresponding to the content type C so that the chunk cutout method is the fixed-length chunk cutout method and the header part is cut out with a fixed length of Lb bytes and data other than the header part is cut out with a length of Lc bytes. An example of such content can be a zip file. If the specified fixed length is 32 KB, the processing function Func_C corresponding to the content type C sequentially cuts out data from the content by 32 KB and recognizes the cutout piece of data as one chunk.

Furthermore, in step S108, the chunk cutout processing is executed on the content whose content type is A; and the cutout method column 903 corresponding to the content type A shows that the content has a structure like that of the content 750 shown in FIG. 4 and the content should be processed by dividing it into the header part, the body part, and the trailer part. Examples of such content can be a PDF (Portable Document Format) file or a virtual disk file. Furthermore, the cutout method column 903 shows that the header part should be cut out as a single chunk, the body part should be cut out into variable-length chunks with a length between the specified maximum length and minimum length, and the trailer part should be cut out as a single chunk. The processing function Func_A corresponding to the content type A executes the chunk cutout processing in accordance with the specification stored in the cutout method column 903.

Now, the details of the chunk cutout processing on the content type A in step 108 in FIG. 5 will be explained with reference to FIG. 7. In the following explanation, the content 750 shown in FIG. 4 is taken as an example of the content whose content type is A.

In step S108 in FIG. 5, the chunk cutout program 104 invokes the processing function Func_A, thereby executing the chunk cutout processing. The content type identification information was obtained in step S103 as described above, so the chunk cutout program 104 can recognize the structure of the header part of the content based on that information. The header part of the content contains information about the length of the header part, the position (offset) and length of the body part in the content, and the position and length of the trailer part. The chunk cutout program 104 takes out the header part, the body part, and the trailer part, respectively, based on the above-mentioned information.

Specifically speaking, the chunk cutout program 104 firstly takes out the header part (752 and 754) of the content 750 (S201). The chunk cutout program 104 cuts out the header part as one chunk in accordance with the specification in the cutout method column 903 of the chunk cutout method control table 900 (S202). The chunk cutout program 104 has the duplication judgment program 106 execute the deduplication processing on the chunk cut out in step S202 (S203).

Next, the chunk cutout program 104 takes out the body part 756 of the content 750 (S204). Practically, a starting address and end address of the body part in the content data in the memory are determined. The starting address and end address of the body part can be obtained by referring to the content of the header part in advance. Then, the chunk cutout program 104 cuts out chunks from the body part 756 by the variable-length chunk cutout method in accordance with the specification in the cutout method column 903 of the chunk cutout method control table 900 (S205). After cutting out the chunks in step S205, the chunk cutout program 104 has the duplication judgment program 106 execute the deduplication processing on the chunks (S206). The deduplication processing by the duplication judgment program 106 will be explained later in detail.

Subsequently, the chunk cutout program 104 judges whether any data which has not been cut out as a chunk remains in the data of the body part 756 (S207). If it is determined in step S207 that data remains in the body part 756, the chunk cutout program 104 repeats the processing in step S205 and subsequent steps. If it is determined in step S207 that no data remains in the body part 756 (remaining bytes=0), the chunk cutout program 104 executes processing in step S208 and subsequent steps.

Next, the chunk cutout program 104 takes out the trailer part 758 of the content 750 (S208). Practically, the chunk cutout program 104 takes out the entire remaining data, other than the data taken out as the header part and the body part, as the trailer part. Then, the chunk cutout program 104 takes out the entire trailer part as a single chunk in accordance with the specification in the cutout method column 903 of the chunk cutout method control table 900 (S209). After taking out the chunk in step S209, the chunk cutout program 104 has the duplication judgment program 106 execute the deduplication processing on that chunk (S210) and then terminates the chunk cutout processing of the content type A.

In step S109 in FIG. 5, the chunk cutout processing is executed on the content whose content type is B; and the cutout method column 903 corresponding to the content type B shows that the content has a structure like that of the content 790 shown in FIG. 4, and not only the content is divided into the header part, the body part, and the trailer part, but also the body part is further divided into a plurality of pieces of subcontent. Examples of such content can include a tar (tape archives) file or an archive file created by backup software. A file format of the archive file, including the offset of the body part and the trailer part in the content and a subcontent storage method, differs depending on the backup software. The processing function Func_B corresponding to the content type B distinguishes, for example, the differences of the file format and takes out each part and the subcontent. Then, the processing function Func_B corresponding to the content type B executes the chunk cutout processing in accordance with the specification stored in the cutout method column 903.

The chunk cutout method column 903 corresponding to the content type B in the chunk cutout method control table 900 shown in FIG. 6 shows that the content should be processed by dividing it into the header part, the body part, and the trailer part, the header part should be cut out by the fixed-length method using a specified length, the body part should be divided into pieces of the subcontent and the chunk cookout method should be selected for each subcontent, and the trailer part should be cut out as a single chunk. The processing function Func_B corresponding to the content type B executes the cutout processing in accordance with the abovementioned specification.

The chunk cutout method to be applied to the subcontent is similar to the cutout method to be applied to the content. If the subcontent does not have any special structure like the subcontent 1 (710), for example, variable-length chunks may be cut out sequentially from the entire subcontent. Furthermore, if the subcontent has a structure like that of the subcontent 720, chunks may be cut out from data of the header part, the body part, and the trailer part by the cutout method corresponding to the content type A. However, even if the body part 726 of the subcontent 720 is further divided into a plurality of pieces of subordinate subcontent, it is not always necessary to divide the subcontent and then execute the chunk cutout processing. This is because the overhead for subcontent decomposition processing increases if the subcontent contained in the subcontent is further decomposed.

Now, the details of the chunk cutout processing of the content type B in step S109 in FIG. 5 will be explained with reference to FIG. 8. In the following explanation, the content 790 shown in FIG. 4 is taken as an example of the content whose content type is B.

In step S109 in FIG. 5, the chunk cutout program 104 invokes the processing function Func_B, thereby executing the chunk cutout processing. The content type identification information was obtained in step S103 as described above, so the chunk cutout program 104 can recognize the structure of the header part of the content based on that information. The chunk cutout program 104 takes out the header part (792 and 794) from the content 790 and obtains positional information of the header part 794, positional information of the body part 796, and positional information of the trailer part 798 (S301). Furthermore, in step S111, the chunk cutout program 104 obtains positional information of the subcontent 710 and 720 of the body part from the header part 796. These pieces of information are utilized to take out the subcontent during the subsequent processing for cutting out the body part.

The chunk cutout program 104 takes out the header part as one chunk in accordance with the specification in the cutout method column 903 of the chunk cutout method control table 900 (S302). The chunk cutout program 104 has the duplication judgment program 106 execute the deduplication processing on the chunk taken out in step S202 (S303). Then, the chunk cutout program 104 judges whether any data which has not been cut out as a chunk remains in the data of the header part 794 (S304). If it is determined in step S304 that data remains in the header part 794, the chunk cutout program 104 repeats the processing in step S302 and subsequent steps. If it is determined in step S304 that no data remains in the header part 794 (remaining bytes=0), the chunk cutout program 104 executes processing in step S305 and subsequent steps.

Subsequently, the chunk cutout program 104 takes out the subcontent from the body part 796 (S305). The position of the subcontent in the content 790 can be recognized based on the information obtained from the header part 794 as described above.

Then, the chunk cutout program 104 judges the subcontent type obtained in step S305 (S306). A case in which two types of subcontent, the content types A and O, are included as the subcontent will be explained below.

The content type of the subcontent 710 is assumed to be O. In this case, the content is cut out by the cutout method corresponding to the content type O. Specifically speaking, the chunk cutout program 104 cuts out the entire subcontent 710 by the variable-length chunk method and then has the duplication judgment program 106 execute the deduplication processing (S307).

On the other hand, the content type of the subcontent 720 is assumed to be A. In this case, the content is cut out by the cutout method corresponding to the content type A. Specifically speaking, the chunk cutout program 104 takes out the header part 722, 724 as a single chunk from the subcontent 720 and has the duplication judgment program 106 execute the deduplication processing (S308). Then, the chunk cutout program 104 takes out the body part 726 from the subcontent 720, cuts it out by the variable-length chunk cutout method, and then has the duplication judgment program 106 execute the deduplication processing (S309). Subsequently, the chunk cutout program 104 takes out the trailer part 728 from the subcontent 720, cuts it out as a single chunk, and has the duplication judgment program 106 execute the deduplication processing (S310).

After termination of the cutout processing on one subcontent, the chunk cutout program 104 checks if any subcontent on which the cutout processing has not been executed remains or not (S311); and if any subcontent remains, the chunk cutout program 104 repeats the processing in step S305 and subsequent steps. On the other hand, if it is determined in step S311 that the processing on all pieces of the subcontent has terminated, the chunk cutout program 104 executes the chunk cutout processing on the content 790, has the duplication judgment program 106 execute the deduplication processing (S312), and then terminates the chunk cutout processing of the content type B.

(1-5) Deduplication Processing

Figure 9:
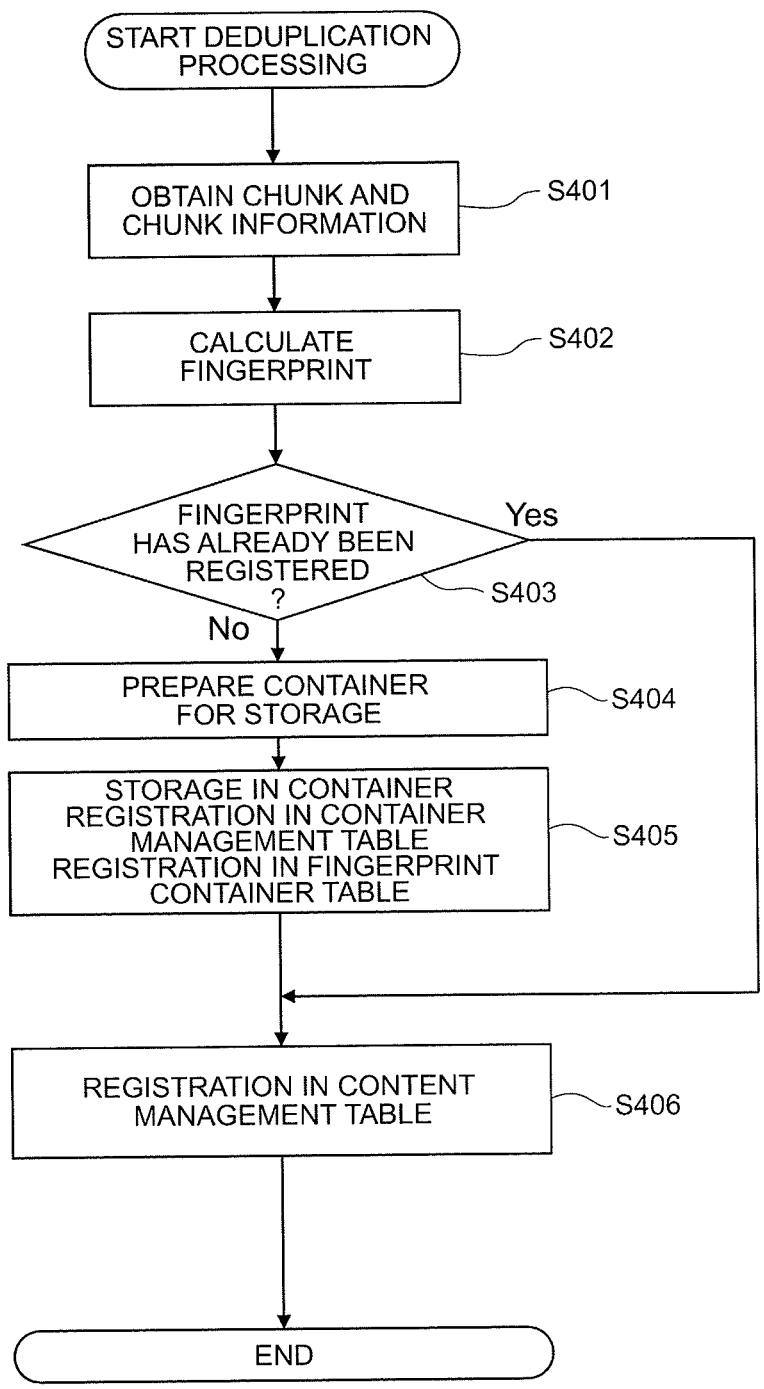
FIG. 9 is a flowchart illustrating a processing sequence for deduplication processing according to the first embodiment.

Next, the deduplication processing executed by the duplication judgment program 106 in, for example, step S206, S210, S303, S307, S308, S309 will be explained. The deduplication processing shown in FIG. 9 will be explained below with reference to the outline of the deduplication processing in FIG. 10 as necessary. As shown in FIG. 9, the duplication judgment program 106 obtains a chunk and chunk information provided from the chunk cutout program 104 (S401). The chunk information means, for example, information such as a content ID of content belonging to the relevant chunk, the position (offset) of the chunk, and the length of the chunk.

Then, the duplication judgment program 106 calculates a fingerprint (FP) of the chunk obtained in step S401 (S402). The fingerprint can be obtained by using a hash function. The hash function herein used is a hash function, such as the SHA 256, which is cryptographically strong enough, and regarding which data of the chunk 400 is highly likely to be uniquely determined by a hash value relative to that data of the chunk 400.

Figure 10:
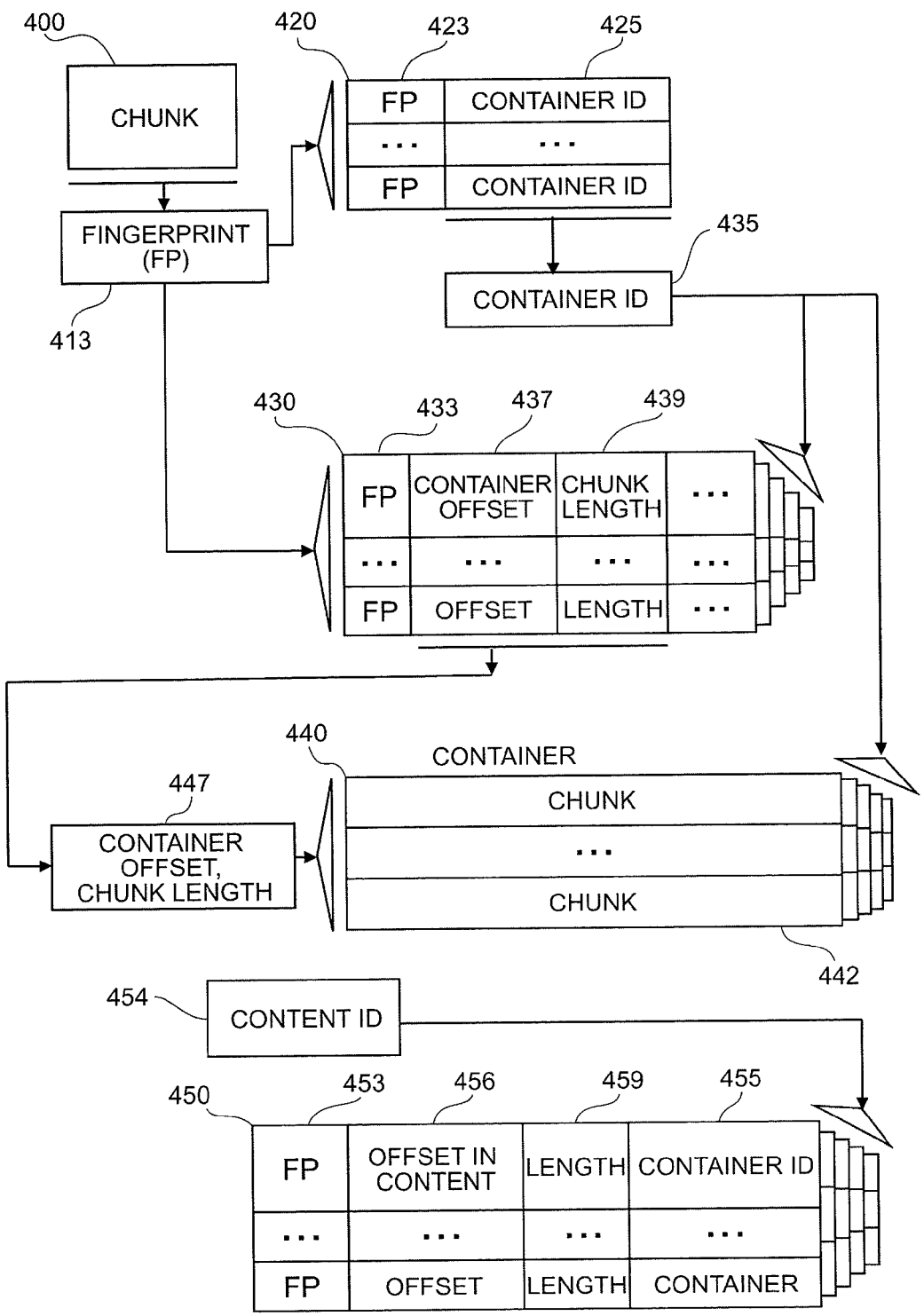
FIG. 10 is a conceptual diagram explaining the outline of the deduplication processing according to the first embodiment.

Subsequently, the duplication judgment program 106 searches a chunk-container table 420 and judges whether or not the fingerprint calculated in step S402 has already been registered in the chunk-container table 420 (S403). A fingerprint (FP) 423 and a container ID 425 are associated with each other and managed in the chunk-container table 420 as shown in FIG. 10. The duplication judgment program 106 judges whether or not the fingerprint 413 calculated from the chunk 400 is registered in the FP column 423 of the chunk-container table 420.

Referring back to FIG. 9, if it is determined in step S403 that the calculated fingerprint is registered in the chunk-container table 420, the duplication judgment program 106 obtains the container ID corresponding to the calculated fingerprint from the chunk-container table 420 and executes processing in step S406 and subsequent steps. On the other hand, if it is determined in step S403 that the calculated fingerprint has not been registered in the chunk-container table 420, the duplication judgment program 106 executes processing in step S404 and subsequent steps.

As shown in FIG. 10, already registered chunks are listed in the chunk-container table 420. In other words, if it is determined in step S403 that the calculated fingerprint is registered in the chunk-container table 420, it is unnecessary to newly store the chunk, which was obtained in step S401, in the deduplicated volume 110 and it means that the deduplication has been performed successfully. On the other hand, if it is determined in step S403 that the calculated fingerprint has not been registered in the chunk-container table 420, it is necessary to newly store the chunk, which was obtained in step S401, in the deduplicated volume 110.

Referring back to FIG. 9, the deduplication program 106 prepares a container for storing the chunk 400 in the chunk-container table 420 (S404). The container means a data block in which some chunks are gathered. The chunk is stored in the deduplicated volume 110 as part of the container. Each container is managed by a container management table 430.

As shown in FIG. 10, the container management table 430 is a table for managing chunks constituting a container and is constituted from a fingerprint (FP) column 433, a container offset column 437, and a chunk length column 439. The fingerprint column 322 stores a fingerprint of the relevant chunk. The container offset column 437 stores information about a chunk storage location in the container. The chunk length column 439 stores information about the chunk length. Furthermore, the container management table 430 may also store other information about the chunk.

Referring back to FIG. 9, the deduplication program 106 writes the chunk data to a container 440 prepared in step S404 and also stores management information about the chunk in the container management table 430 (S405). Specifically speaking, the deduplication program 106 determines at which location in the container 440 the chunk should be stored; and stores the address of that location and the chunk length in the container management table 430. Accordingly, when reading the chunk, the deduplication program 106 searches for an entry of the container management table 430 corresponding to the fingerprint based on a value of the fingerprint of the chunk and reads the container offset and chunk length corresponding to the fingerprint. Furthermore, the deduplication program 106 stores the fingerprint in the FP column 324 of the chunk-container table 420 and stores the container ID of the container for storing the chunk, in the container ID column 425. As a result, deduplication by the subsequent deduplication processing can be executed on a chunk(s) having the same chunk content as that of the chunk 400.

Subsequently, the deduplication program 106 registers content management information in a content management table 450 (S406) and terminates the deduplication processing. The content management table 450 is constituted from an FP column 453, an offset-in-content column 456, a length column 459, and a container ID column 455 as shown in FIG. 10. The FP column 453 stores a fingerprint of the relevant chunk. The offset-in-content column 456 stores the number of bytes from the top of the content as a position of the relevant chunk in the content. The length column 459 stores the chunk length. The container ID column 455 stores a container ID of a container to which the relevant chunk belongs. When reading data of the content by using the content management table 450, the container storing each of chunks constituting the content can be identified with the container ID and a read target chunk can be read from the content on the basis of the offset in the content and the chunk length.

Next, a deduplication optimization screen 1200 for setting and changing the content type and setting and changing the chunk cutout method for the content or subcontent will be explained with reference to FIG. 11. The deduplication optimization screen 1200 is displayed on a display screen of the management server 108 and, for example, parameter settings are made in accordance with input by the operator. The operator inputs a value in each field of an application method field 1220 and a chunk length field 1230 with respect to each content type 1210. A value of each field may be selected by the operator from previously set values. Set values, such as the chunk cutout method, which are set via the deduplication optimization screen 1200 are stored in the respective fields of the chunk cutout method control table 900 in FIG. 6.

For example, if the content type 1210 is A, the operator selects Based on Structure indicating analysis of the internal structure, as the application method 1220. Furthermore, the operator selects Single Instance meaning that the header part should be cut out as one chunk, Variable Length meaning that the chunk should be cut out from the body part by the variable length cutout method, and Single Instance meaning that the trailer part should be cut out as one chunk. Furthermore, if the content type 1210 is C, the operator selects Fixed Length meaning that the chunk should be cut out by the fixed length cutout method. Furthermore, if the fixed length is selected, the operator inputs a fixed value; and if the variable length is selected, the operator inputs an intermediate value between a maximum value and a minimum value. If the variable length is selected, a half of the input intermediate value is set as the minimum value and a value twice as large as the intermediate value is set as the maximum value. Furthermore, in the case of the variable length, the deduplication optimization screen 1200 may be an interface for designating the minimum value and the maximum value.

Figure 12:
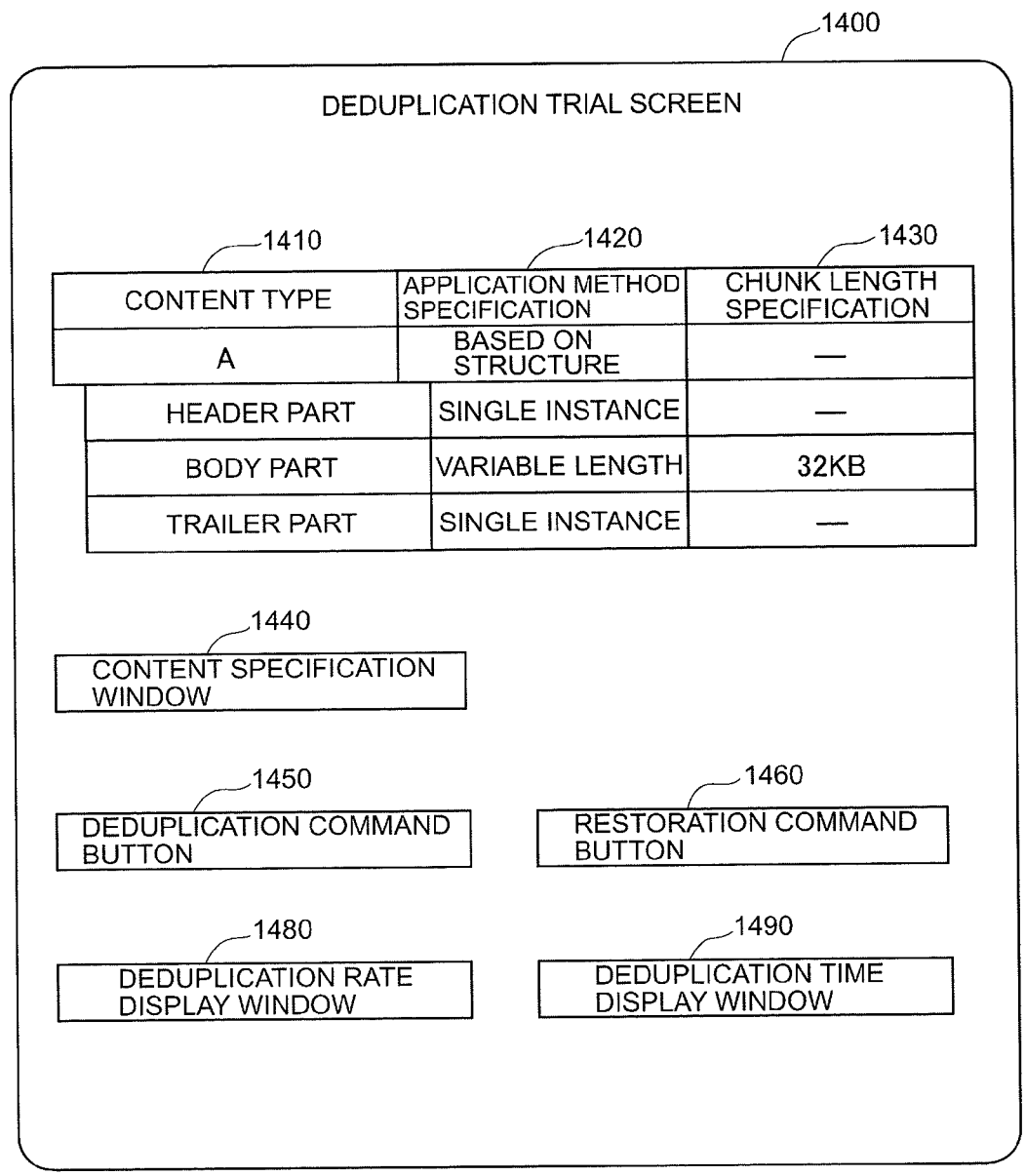
FIG. 12 is a chart showing a deduplication trial screen according to the first embodiment.

Next, a deduplication trial screen 1400 for executing the deduplication processing by specifying the content, and monitoring the result of deduplication will be explained with reference to FIG. 12. The deduplication trial screen 1400 is displayed on a display screen of the management server 108 and, for example, the content is specified in accordance with input by the operator. Specifically speaking, the operator specifies a file in a target file volume 112 in a content specification window 1440. A content type field 1410 displays the chunk cutout method to be applied to the content.

When a deduplication command button 1450 is pressed, the deduplication processing is executed on the specified file and the execution result is displayed in a deduplication rate display window 1480 and a deduplication time display window 1490. Information about the deduplication other than the deduplication rate or the deduplication time may be displayed. Furthermore, the deduplication rate and the deduplication time are calculated again by specifying the content in the content specification window 1440, changing values of application method specification 1420 and chunk length specification 1430, and pressing the deduplication command button 1450. The deduplication rate and the deduplication time are calculated by invoking the duplication judgment program 116.

If a restoration command button 1460 is pressed, the designated content is taken out of the deduplicated volume 110 and then stored again in the file volume 112.

As a matter of fact, the deduplication rate decreases if the chunk cutout method and the chunk length specification differ between backup generations. Changes of the chunk cutout method and the chunk length on the deduplication trial screen 1400 are utilized when tuning the method for applying the chunk cutout method. Set values of, for example, the chunk cutout method and the chunk length which are set via the deduplication trial screen 1400 are stored in the respective fields in the chunk cutout method control table 900.

(1-6) Advantageous Effects of this Embodiment

According to this embodiment, the backup apparatus 100 recognizes a backup file provided from the first backup server 150 or the second backup server 152 as the content, cuts out the content in to one or more chunks, and manages the duplicate state of the cutout chunks as described above. When cutting out the chunks, the backup apparatus 100 selects the method for cutting out the content, whether the fixed-length chunk cutout method, the variable-length chunk cutout method, or the single instance the chunk cutout method, based on the content type identification information indicating the content type. As a result, the deduplication efficiency and the processing efficiency of the deduplication processing can be enhanced by selecting the chunk cutout method according to the content type and cutting out the chunks by the selected method.

(2) Second Embodiment (2-1) Hardware Configuration of Computer System

Figure 13:
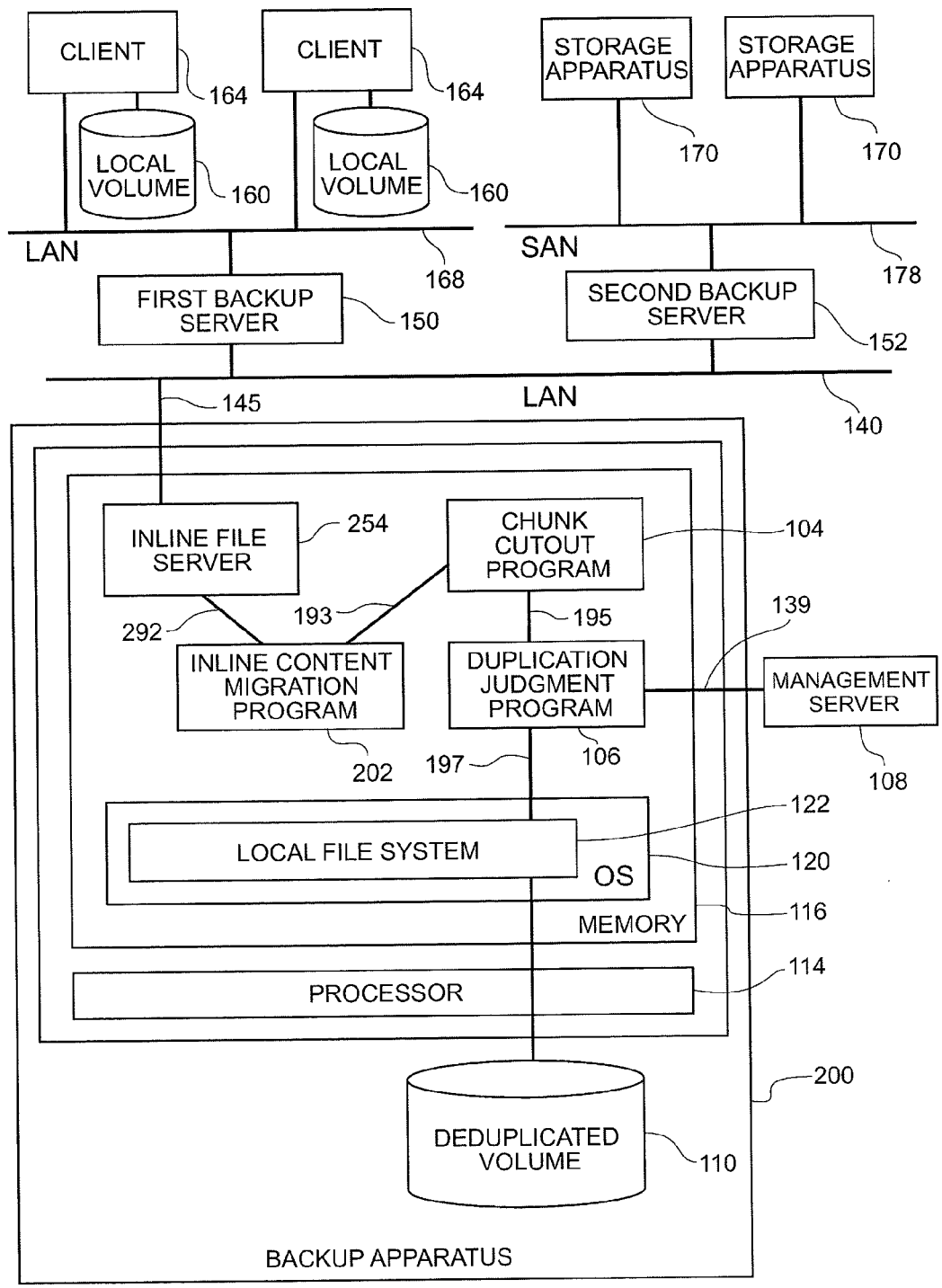
FIG. 13 is a block diagram showing a hardware configuration of a computer system according to a second embodiment of the present invention.

Next, the configuration of a computer system 2 will be explained with reference to FIG. 13. The computer system 2 is configured as an inline-type deduplication system. The inline-type deduplication system means that the deduplication processing is executed immediately on data provided from the host system. Specifically speaking, as shown in FIG. 13, the difference between a backup apparatus 200 of the computer system 2 and the backup apparatus 100 according to the first embodiment is that a backup volume is not needed in the backup apparatus 200. The backup apparatus 200 is equipped with an inline file server 254, instead of the file server 154 of the backup apparatus 100, and an inline content migration program 202 instead of the content migration program 102.

In response to a request from the first backup server 150 or the second backup server 152 to store a backup file, the inline file server 254 provides the backup file to the inline content migration program 202. Then, the inline content migration program 202 provides the backup file, which has been provided from the inline file server 254, as the content to the chunk cutout program 104.

The functions and processing of the chunk cutout program 104 and the duplication judgment program 106 are the same as those in the first embodiment, their detailed explanation has been omitted.

(2-2) Advantageous Effects of this Embodiment

Since a backup volume is not needed in the backup apparatus 200 according to this embodiment as described above, the resources of the storage system can be reduced. Also, since the deduplication processing can be executed immediately without storing data such as a backup file in the backup volume, processing time of backup processing can be shortened.

(3) Third Embodiment (3-1) Hardware Configuration of Computer System

Figure 14:
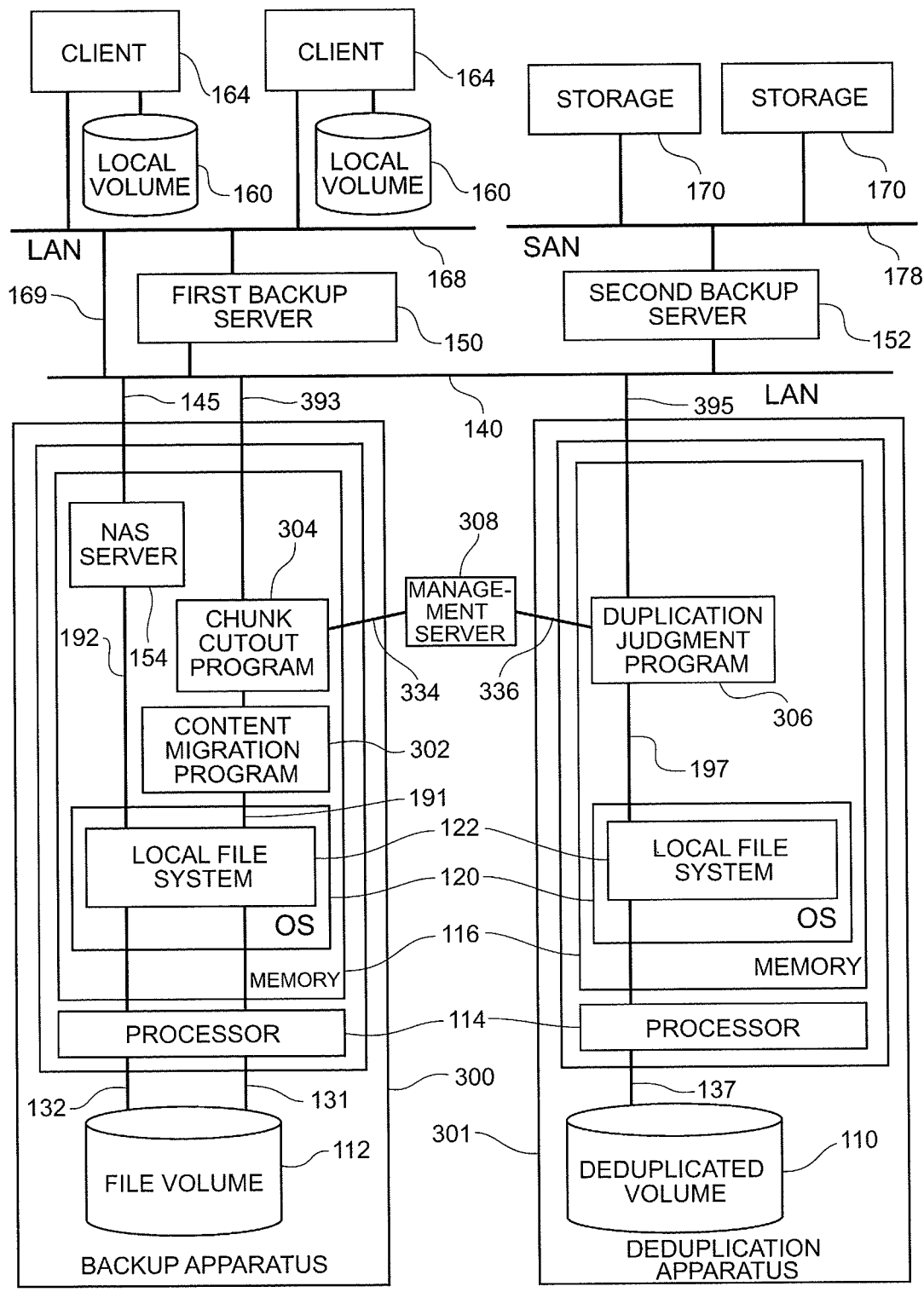
FIG. 14 is a block diagram showing a hardware configuration of a computer system according to a third embodiment of the present invention.

The configuration of a computer system 3 according to this embodiment will be explained with reference to FIG. 14. The difference between the computer system 3 and the computer system 1 according to the first embodiment is that the computer system 3 is equipped with a deduplication apparatus 301 for executing deduplication processing, separately from a backup apparatus 300 for backing up data.

The backup apparatus 300 includes the backup volume 112, the processor 114, the memory 116, the OS 120, and the local file system 122. Furthermore, software stored in the memory 116 includes, for example, a content migration program 302 and a chunk cutout program 304.

The content migration program 302 reads a backup file stored in the backup volume 112 and provides it as the content to the chunk cutout program 304. Also, the chunk cutout program 304 cuts out a chunk(s), which is a deduplication processing unit, from the content provided from the content migration program 302. The chunk cutout program 304 cuts out the chunk(s) from the content by using an optimum chunk cutout method according to the content type. Since the chunk cutout processing by the chunk cutout program 103 is the same processing as that in the first embodiment, its detailed explanation has been omitted. The chunk(s) cut out by the chunk cutout program 304 is provided via the LAN 140 to a duplication judgment program 306 of the deduplication apparatus 301.

The deduplication apparatus 301 includes the deduplicated volume 110, the processor 114, the memory 116, the OS 120, and the local file system 122. Furthermore, software stored in the memory 116 includes, for example, the duplication judgment program 306.

The duplication judgment program 306 examines the duplicate state of the chunks provided from the chunk cutout program 304 of the backup apparatus 300, executes processing for eliminating duplicate chunks, and stores new chunks in the deduplicated volume 110.

A management server 308 is connected to the backup apparatus 300 and the deduplication apparatus 301. The management server 308 monitors operational parameter settings and operational status of the chunk cutout program 304 via a management network 334. Also, the management server 308 monitors operational parameter settings and operational status of the duplication judgment program 306 via the management network 336.

(3-2) Advantageous Effects of this Embodiment

According to this embodiment, the backup apparatus 300 is equipped with the chunk cutout program 304 and the deduplication apparatus 301 is equipped with the duplication judgment program 306 as described above, so that the chunk cutout processing and the duplication judgment processing are executed by the separate devices. As a result, processors of the different devices execute the chunk cutout processing and the duplication judgment processing, respectively, so that the deduplication processing can be executed more efficiently.

(4) Other Embodiments

The aforementioned embodiments have described the case where the processor 114 is used as a control unit for controlling the entire processing relating to various functions according to such embodiments; however, the present invention is not limited to those embodiments, and hardware and/or software for executing the processing as such control unit may be provided separately from the processor 114. Even if such hardware and/or software are provided, the same advantageous effects as those of the aforementioned embodiments can be obtained.

Furthermore, for example, the respective steps of the processing by the backup apparatus 100 or other devices in this specification do not necessarily have to be processed chronologically in the order described in the relevant flowchart. In other words, the respective steps in the processing by the backup apparatus 100 or other devices may be executed in parallel even if they are different processing.

Furthermore, hardware such as a CPU, ROM, and RAM contained in, for example, the backup apparatus 100 may be created as a computer program for fulfilling functions equal to those of each component such as the aforementioned backup apparatus 100. Furthermore, storage media in which such a computer program is stored is provided.

INDUSTRIAL APPLICABILITY

The present invention can be applied to a wide variety of storage apparatuses for executing the deduplication processing according to the type of data.

REFERENCE SIGNS LIST

100 Backup apparatus
102 Content migration program
104 Chunk cutout program
106 Duplication judgment program
108 Management server
110 Deduplicated volume
112 Backup volume
114 Processor
116 Memory
122 Local file system
150 First backup server
152 Second backup server
160 Local volume
164 Client
170 Storage apparatus

The invention claimed is:

1. A storage apparatus for storing content in a backup volume in response to a content storage request from a host system connected to the storage apparatus via a network, the storage apparatus comprising:
a chunk cutout unit for cutting out the content into one or more chunks; and
a duplication judgment unit for managing a duplicate state of the chunk or chunks which have been cut out by the chunk cutout unit;
wherein the content has management information and data, and the management information is attached to the content and is based on properties of the content and indicates a type of the content, and
wherein the chunk cutout unit distinguishes between the management information and the data and selects a method for cutting out the chunk based on the management information.

2. The storage apparatus according to claim 1,
wherein if it is determined based on the content type identification information that the content is content including subcontent, the chunk cutout unit cuts out the subcontent from the content and selects the chunk cutout method for the subcontent based on the content type identification information included in the subcontent.

3. The storage apparatus according to claim 2,
wherein if a content length of the content is equal to or shorter than a specified length, the chunk cutout unit selects a single instance method of cutting out the content as a single chunk.

4. The storage apparatus according to claim 2,
wherein if it is determined based on the content type identification information that the content is additionally-data-written-type content, the chunk cutout unit selects a fixed-length chunk method of cutting out the content into a chunk with a specified length.

5. The storage apparatus according to claim 2,
wherein if it is determined based on the content type identification information that the content is data-insertion-type content, the chunk cutout unit selects a variable-length chunk method of cutting out the chunk at each boundary position of a data segment with a variable length included in the content.

6. The storage apparatus according to claim 2, furthermore comprising a chunk cutout method management table for managing a content type identified with the content type identification information and the chunk cutout method by associating the content type with the chunk cutout method;
    wherein the chunk cutout unit obtains the content type identification information included in the content, refers to the chunk cutout method management table, and specifies the chunk cutout method corresponding to the content type identification information.

7. The storage apparatus according to claim 6,
    wherein the chunk cutout method corresponding to content type identification information is a single instance method of cutting the content as a single chunk, a fixed-length chunk method of cutting out the content into a chunk with a specified length, and a variable-length chunk method of cutting out the chunk at each boundary position of a data segment with a variable length included in the content.

8. The storage apparatus according to claim 2,
    wherein the chunk cutout unit; selects a minimum length of the chunk to be cut out of the content; and
    cuts out the chunk from the content so that the chunk will be of a length equal to or longer than the selected minimum length.

9. The storage apparatus according to claim 2,
    wherein the chunk cutout unit;
    selects a maximum length of the chunk to be cutout of the content; and
    cuts out the chunk from the content so that the chunk will be of a length equal to or shorter than the selected maximum length.

10. A duplicate data detection method using a storage apparatus for storing content in a backup volume in response to a content storage request from a host system connected to the storage apparatus via a network,
    the duplicate data detection method comprising:
    a first step executed by a chunk cutout unit cutting out the content into one or more chunks; and
    a second step executed by duplication judgment unit managing a duplicate state of the chunk or chunks which have been cut out in the first step;
    wherein the content has management information and data, and the management information is attached to the content and is based on properties of the content and indicates a type of the content, and
    wherein in the first step, the chunk cutout unit distinguishes between the management information and the data and selects a method for cutting out the chunk based on the management information.

11. The duplicate data detection method according to claim 10, further comprising a third step executed, if it is determined based on the content type identification information that the content is content including subcontent, by the chunk cutout unit cutting out the subcontent from the content and selecting the chunk cutout method for the subcontent based on the content type identification information included in the subcontent.

12. The duplicate data detection method according to claim 11, further comprising a fourth step executed, if a content length of the content is equal to or shorter than a specified length, by the chunk cutout unit selecting a single instance method of cutting out the content as a single chunk.

13. The duplicate data detection method according to claim 11, further comprising a fifth step executed, if it is determined based on the content type identification information that the content is additionally-data-written-type content, by the chunk cutout unit selecting a fixed-length chunk method of cutting out the content into a chunk with a specified length.

14. The duplicate data detection method according to claim 11, further comprising a sixth step executed, if it is determined based on the content type identification information that the content is data-insertion-type content, by the chunk cutout unit selecting a variable-length chunk method of cutting out the chunk at each boundary position of a data segment with a variable length included in the content.

15. The duplicate data detection method according to claim 11,
    wherein the chunk cutout unit includes a chunk cutout method management table for managing a content type identified with the content type identification information and the chunk cutout method by associating the content type with the chunk cutout method; and
    wherein the duplicate data detection method further comprises a seventh step executed by the chunk cutout unit obtaining the content type identification information included in the content, referring to the chunk cutout method management table, and specifying the chunk cutout method corresponding to the content type identification information.

16. The duplicate data detection method according to claim 15,
    wherein the chunk cutout method corresponding to the content type identification information is a single instance method of cutting the content as a single chunk, a sixed-length chunk method of cutting out the content into a chunk with a specified length, and a variable-length chunk method of cutting out the chunk at each boundary position of a data segment with a variable length included in the content.

17. The duplicate data detection method according to claim 11, further comprising a eighth step executed by the chunk cutout unit selecting a minimum length of the chunk to be cut out of the content and cutting out the chunk from the content so that the chunk will be of a length equal to or longer than the selected minimum length.

18. The duplicate data detection method according to claim 11, further comprising an ninth step executed by the chunk cutout unit selecting a maximum length of the chunk to be cut out of the content and cutting out the chunk from the content so that the chunk will be of a length equal to or shorter than the selected maximum length.

* * * * *